(12) United States Patent
Garimberti (10) Patent No.: US 11,849,697 B2
(45) Date of Patent: Dec. 26, 2023

(54) MONITORING SYSTEM (71) Applicant: MILKRITE INTERPULS LIMITED, Melksham (GB)

(72) Inventor: Andrea Garimberti, Viano (IT)

(73) Assignee: INTERPULS S.P.A., Albinea (IT)

( * ) Notice: Subject to any disclaimer, the term of this patent is extended or adjusted under 35 U.S.C. 154(b) by 0 days.

(21) Appl. No.: 18/040,863

(22) PCT Filed: May 20, 2021

(86) PCT No.: PCT/EP2021/063512
§ 371 (c)(1),
(2) Date: Feb. 7, 2023

(87) PCT Pub. No.: WO2022/028748
PCT Pub. Date: Feb. 10, 2022

(65) Prior Publication Data
US 2023/0301267 A1    Sep. 28, 2023

(30) Foreign Application Priority Data

Aug. 7, 2020 (GB) ..................................... 2012334

(51) Int. Cl.
*A01J 5/00* (2006.01)
*A01J 5/007* (2006.01)

(52) U.S. Cl.
CPC ..................................... *A01J 5/007* (2013.01)

(58) Field of Classification Search
CPC ..................................... A01J 5/007; A01J 5/14
See application file for complete search history.

(56) References Cited

U.S. PATENT DOCUMENTS 3,703,645 A    11/1972   Swift
5,584,262 A *  12/1996   Schultz ................ A01J 5/14
                                                    119/14.28
2007/0137580 A1  6/2007   Brown et al.

FOREIGN PATENT DOCUMENTS

EP    0640281 A1   3/1995
EP    0831691 B1   6/2001
IL       61561 A    2/1985

OTHER PUBLICATIONS

Intellectual Property Office, Patents Act 1977: Search Report under Section 17 re Corresponding Application GB2012334.5, dated Jan. 26, 2021, 1 page.
Intellectual Property Office, Patents Act 1977: Search Report under Section 17 re Corresponding Application GB2012334.5, dated Apr. 26, 2021, 1 page.

* cited by examiner

*Primary Examiner* — Yvonne R Abbott-Lewis
(74) *Attorney, Agent, or Firm* — McGarry Bair PC (57) ABSTRACT

A monitoring system for monitoring a milking point includes an input configured to receive an electrical pulsation signal for controlling pulsation of a pulsator, and a processor configured to identify the occurrence of a milking session based on the electrical pulsation signal received at the input. A signal sensor measures a characteristic of the pulsation signal. The monitoring system may include a connector configured for electrical connection with a solenoid of a pulsator of the milking point. A power harvesting module is configured to harvest power from a flyback voltage generated by the solenoid upon interruption of a current supplied to the solenoid.

21 Claims, 3 Drawing Sheets

MONITORING SYSTEM

CROSS-REFERENCE TO RELATED APPLICATIONS

This application is a U.S. National Phase application of International Application No. PCT/EP2021/063512, filed on May 20, 2021, which claims the benefit of Great Britain Application 2012334.5, filed Aug. 7, 2020, both of which are incorporated herein by reference in their entireties.

TECHNICAL FIELD

The present invention relates to a monitoring system for monitoring one or more milking points of a milking parlour (used for milking animals).

BACKGROUND

Automatic milking systems are used to reduce the manual labour required for milking dairy animals, such as cows, sheep, goats, camels, buffalos and donkeys. Such systems typically comprise a milking point that includes a milking claw or cluster having either two or four teat cups (or sleeves) that attach to the teats of the animal. In operation, the cluster draws milk from the teats of the animal and discharges the milk for collection.

Each teat cup comprises an outer shell formed of a rigid material and an inner liner attached to the outer shell so as to define a cavity therebetween. The teat cup is tubular, such that an inner surface of the inner liner forms a central passage extending longitudinally therethrough. In operation, an animal's teat is inserted into an upper opening of this passage and a vacuum is applied to a lower opening of the passage so as to draw milk from the teat and downwardly through the passage. A second vacuum is then applied, in pulses (i.e. alternating between vacuum and atmospheric pressures), to the cavity between the liner and the outer shell.

When the cavity is at atmospheric pressure, the vacuum applied to the central passage causes the inner liner to collapse inwardly and across the passage, so as to close the passage between the upper and lower openings, and so as to relieve the teat from the vacuum applied to the passage. This is considered the non-milking (or rest) phase of the teat cup, because milk is not being extracted from the animal.

On the other hand, when a vacuum is applied to the cavity between the liner and the outer shell, the liner retracts outwardly so as to open the passage, such that the teat is exposed to the vacuum applied at the lower opening of the passage. This is considered the milking phase, because milk is extracted from the animal when the liner is in this position.

The pulses of vacuum are applied by a pulsator, which comprises a valve for alternating between the application of the vacuum and atmospheric pressures. Some pulsators have an inbuilt controller for controlling the timing of the vacuum pulses. Other pulsators are controlled by an external controller, such as a pulsator controller or a milking panel.

It is important for the milking claw (as actuated by the pulsator) to operate in a particular manner to ensure efficient extraction of milk and to maintain the health of the animal. Hence, in some systems, sensors are be used to monitor the operation of the milking cluster (and/or the pulsator). Such sensors, however, can require significant additional wiring for the supply of power, and for communication of any measurements made by the sensor. This can complicate the installation of such systems, especially in large installations encompassing a significant number of milking clusters.

The present invention has been devised in light of the above considerations.

SUMMARY OF THE INVENTION

In a first aspect, there is provided a monitoring system for monitoring a milking point, the monitoring system comprising an input configured to receive an electrical pulsation signal for controlling pulsation of a pulsator, and a processor configured to identify the occurrence of a milking session based on the electrical pulsation signal received by the input.

By making use of a pulsation signal to identify the occurrence of a milking session, the system may be retrofitted into existing systems that do not include such functionality.

The term "milking session" is used herein to describe the period in which an animal is being milked.

The monitoring system may comprise a monitoring device. The input may form part of the monitoring device (and the processor may be external to the monitoring device). The monitoring device may be configured so as to be powered by the pulsation signal. For example, the monitoring system may comprise a power harvesting module such as that described below with regards to the third aspect.

In this respect, when the monitoring device is receiving a pulsation signal, it may be in an active state, and when monitoring device is not receiving the pulsation signal (i.e. when it terminates or shortly thereafter), the monitoring device may be in an inactive (i.e. unpowered) state.

The input may be configured for operative connection with a controller (e.g. a pulsator controller or milking panel) that generates the pulsation signal. In other words, the pulsation signal may be generated by a controller (i.e. external to the monitoring system), such as a pulsation controller or milking panel.

The monitoring device may comprise a communication interface for communication with the processor (which may be external to the monitoring device). The communication interface may be a wireless interface. For example, the wireless interface may be a Bluetooth™ interface configured to communicate wirelessly according to Bluetooth™ wireless technology standards. The wireless interface may be, or may be based on, a Bluetooth Low Energy interface. The wireless interface may, of course, comprise another form of low energy wireless technology, such as Wi-Fi HaLow.

The processor may be powered by a power source other than the pulsation signal. The processor may be configured to identify the occurrence of a milking session based on whether the monitoring device is in the active or inactive state. When the monitoring device is in an active state, this is indicative of the pulsation signal being received and powering the device, which is in turn indicative of the occurrence of a milking session. When the monitoring device is in an inactive state, this is indicative of an absence of the pulsation signal (and an absence of power), which in turn is indicative that a milking session is not occurring.

Accordingly, the processor may be configured to record a start event indicative of the start of a milking session when the processor determines that the monitoring device has changed from an inactive state to an active state.

Likewise, the processor may be configured to record an end event indicative of the end of a milking session when the processor determines that the monitoring device has changed from an active state to an inactive state.

Recording a start and/or end event may comprise recording a timestamp for the start and/or end event. The processor may be configured to determine a milking session duration based on a time difference between consecutive start and end events.

The system may comprise a receiver configured to communicate with the communication interface of the monitoring device. The processor may be operatively connected to the receiver (i.e. for receiving data from the receiver).

The processor may be configured to identify the occurrence of a milking session based on whether the receiver is connected to (i.e. communicating with) the communication interface. As the communication interface forms part of the monitoring device, the monitoring device may only communicate with the receiver when in an active state.

The processor may be configured to record a start event of a milking session upon connection of the receiver with the communication interface, and may be configured to record an end event upon disconnection between the receiver and the communication interface.

The receiver may be configured to send data requests, and the communication interface may be configured to respond to the data requests when (i.e. only when) the monitoring device is in an active state. A data request to which the communication interface responds may be deemed a successful request, and a data request to which the communication interface does not respond may be deemed an unsuccessful request.

The receiver may be configured to send the data requests in a periodic manner. The processor may be configured to record a start event of a milking session in response to a successful request. The processor may be configured to record an end event in response to one or more consecutive unsuccessful requests.

For example, the processor may be configured to record an end event in response to a predetermined number of successive unsuccessful request (e.g. two, three, or four successive unsuccessful requests). This may prevent, for example, erroneous recordal of the end of a milking session where disconnection between the receiver and the communication interface is only temporary (and not caused by termination of the pulsation signal).

The processor may comprise a microprocessor, a circuit, controller, or other suitable arrangement for providing the required processing functionality.

The monitoring system may comprise a memory. The memory may be volatile or non-volatile memory, including, for example, random access memory (RAM) or read-only memory (ROM). The processor may be configured to record each start and end event (of a milking session) in the memory.

The monitoring system may comprise a plurality of monitoring devices, each as described. Each monitoring device may be configured to monitor one or more milking points. In this way, the system may be used to monitor and record the use of a plurality of milking points.

The monitoring system may additionally (or alternatively) be configured for operation with milking points in which a pulsation signal is provided regardless of whether a milking session is occurring or not. Thus, the input discussed above may be referred to as a pulsation input and the monitoring system (e.g. the monitoring device) may additionally or alternatively comprise a further input referred to herein as a shut off input. The shut off input may be configured for receipt of a shut off signal from a shut off sensor of a milking point. The shut off sensor may form part of a shut off device for shutting off the vacuum applied to the teats of an animal via a cluster of the milking point (which then allows detachment of the cluster). The processor may be configured to record start and end events in response to the shut off signal. The system may be configured to process these start and end events as discussed above.

Based on the identification of milking sessions, the processor may be configured to determine e.g. number of milkings occurring at a milking point, average milking duration, active milking time, etc.

The pulsator(s), cluster and/or controller (e.g. milking panel or pulsator controller) may form part of the system.

The monitoring system of the first aspect may be as otherwise described below with respect to the second and/or third aspect. Thus, the monitoring system of the first aspect may therefore comprise one or more features of the second and/or third aspects.

In a second aspect, there is provided a monitoring system for monitoring a milking point, the monitoring system comprising:

an input configured to receive an electrical pulsation signal for controlling pulsation of a pulsator;

a signal sensor configured to measure a characteristic of the pulsation signal;

a processor configured to determine an operating condition of the milking point based on the measurement made by the sensor.

Analysis of a pulsation signal may provide information about the performance or state of a milking point. Such information can, for example, be used to ensure that the milking point is operating within desirable bounds, and can be used to implement improvements to the operation of the milking point. In this way, parameters of the milking point can be adjusted to return the milking point to a desirable operating condition, or to improve the operation of the milking point. By using the pulsation signal for such analysis, the system may be retrofitted within existing systems that are otherwise unable to provide such features.

The system may comprise a pressure sensor configured to measure pressure at an outlet of a pulsator (to which the system may be operatively connected). The pressure sensor may be configured for fluid connection with an outlet of the pulsator (i.e. which may in turn be fluidly connected to a cluster of the milking point). The pressure sensor may be configured to generate a pressure signal indicative of the measured pressure (which may in turn be indicative of the pressure in a teat cup of the cluster).

In some embodiments, the pressure sensor may additionally be configured to measure pressure (i.e. vacuum) of a vacuum supply line (e.g. supplying the pulsator or teat cups). In other words, in an alternate configuration of the system, the pressure sensor may be fluidly connected to the vacuum supply line to measure pressure of the vacuum supply line. The processor may be configured to measure the pressure signal (of the vacuum supply line) and compare the pressure signal to threshold values. The threshold values may be selected based on a desired pressure range of the vacuum supply line. In this respect, the monitoring device may be configured for monitoring (when configured in this way) stability of the vacuum supply line.

The processor may be configured to compare a pressure signal (i.e. indicative of the pressure at the outlet of the pulsator) with the pulsation signal (i.e. a measured characteristic of the pulsation signal) to determine an operating condition of the milking point. The pressure signal may be produced by the pressure sensor (when present) or may be received from an external pressure sensor). The comparison may comprise determining a phase difference (or lag) between the pressure signal and the pulsation signal. The comparison may comprise comparing the frequency of the pressure signal to the frequency of the pulsation signal.

The processor may be configured to generate an alert when the determined operating condition is not (i.e. does not match) a desired operating condition.

As above, the processor may be configured to determine an operating condition of the milking system based on the comparison (e.g. differences between) the pressure signal and the pulsation signal. By comparing the pressure signal with the pulsation signal, the monitoring system may be able to monitor milking points in which different pulsation signals can be selected (e.g. the rate of the pulsation signal can be changed), for example, according to the animal being milked. This in contrast to systems in which, for example, the pressure is compared against static values (e.g. input by an operator) that do not change in response to a change of pulsation signal.

Although the pressure signal is dependent on the pulsation signal, in operation, there are differences between these signals, because the changes in the pulsation signal are mostly instantaneous, while the changes in the pressure are not.

As is noted above, pulsators commonly comprise solenoid valves that repetitively switch so as to alternate between the provision of atmospheric pressure or a vacuum (negative pressure) at the pulsator outlet. Thus, the pressure measured by the pressure sensor, in normal operation, will follow a cycle (which may be represented by a curve) that alternates between periods of atmospheric pressure and vacuum. In practice, each cycle also includes transition periods in which the pressure transitions between vacuum and atmospheric pressure (and vice-versa). Thus, each cycle generally includes four phases: an "A" phase, in which the pressure transitions from atmospheric to vacuum; a "B" phase, in which the vacuum is maintained; a "C" phase, in which the pressure transitions from vacuum to atmospheric; and a "D" phase in which atmospheric pressure is maintained.

The pulsation signal, on the other hand, may be in the form of pulses of electrical power. In this respect, the pulsation signal may be represented by a square wave. Each period (i.e. pulse) of electrical power may represent an activation period of the pulsation signal in which the signal activates the pulsator (causing it to apply a vacuum to a teat cup). In this way, each activation period may correspond to a milking period, in which milk is being extracted from the animal. Each period between two successive activation periods may be a deactivation period in which no power is supplied by the pulsation signal, and in which the pulsator supplies air at atmospheric pressure to the teat cup. In this way, each deactivation period may correspond to a non-milking (or rest) period in which milk is not being extracted from the animal.

The processor may be configured to determine a duration between the start of an activation period (as measured from the pulsation signal) and the start of a corresponding cycle (e.g. the start of an A phase) of the pressure signal. In other words, the processor may be configured to determine a duration between the start of an activation period and a corresponding pressure decrease (of the pressure signal). This duration may indicate the delay between the pulsation signal and the pressure signal. The processor may be configured to compare the determined duration with a maximum threshold duration value and generate an alert signal if the duration exceeds the maximum duration threshold value. The alert signal may be indicative of an issue with the pulsator, vacuum lines from the pulsator to the cluster, or with the cluster.

The processor may be configured to determine a duration between the end of an activation period and the start of the "C" phase of a corresponding cycle of the pressure signal. In other words the processor may be configured to determine a duration between the end of an activation period and a corresponding pressure increase of the pressure signal. The processor may be configured to compare the determined duration with a maximum threshold duration value and generate an alert signal if the duration exceeds the maximum duration threshold value. The alert signal may be indicative of an issue with the pulsator, vacuum lines from the pulsator to the cluster, or with the cluster.

The processor may be configured to determine whether the measured characteristic (of the pulsation signal) falls within a desired range. The processor may For example, the processor may be configured to compare the measured characteristic with minimum and/or maximum threshold values. The processor may be configured to generate an alert if the measured characteristic falls outside of the desired range (i.e. exceeds a maximum threshold value or falls below a minimum threshold value). The alert signal may be indicative of a fault in a controller generating the pulsation signal, or a fault in a pulsator operatively connected to the monitoring system.

The processor may be configured to determine changes in measured characteristics over time. For example, the processor may be configured to compare measured characteristics with historical measurements (from previous milking sessions). Changes in measured characteristic over time may be indicative of wear of components of a milking point.

The measured characteristic may comprise a voltage and/or current of the pulsation signal. Hence, the signal sensor may be configured to measure the voltage and/or the current of the pulsation signal. The current may be a current drawn by a pulsator (to which the system may be operatively connected) and the voltage may be a voltage applied to the pulsator. In this respect, the system may comprise a voltage and/or current sensor operatively connected to (or forming part of) the processor.

The processor may be configured to determine whether the rate of change of the current drawn by the pulsator falls within a desired range (i.e. determined by maximum and/or minimum threshold values). The processor may be configured to generate an alert signal when the rate of change of the measured current falls outside of the desired range. The alert signal may be indicative of wear of a coil of the pulsator.

The device may comprise a user interface for indicating information to an operator. The user interface may comprise a light, such as an LED. The user interface may be configured to indicate whether an alert has been generated by the processor.

The monitoring system may comprise a memory. The memory may be volatile or non-volatile memory, including, for example, random access memory (RAM) or read-only memory (ROM). The processor may be configured to store measured values (i.e. based on measured signals) in the memory. The processor may be configured to store threshold values (i.e. the various threshold values discussed above) in the memory.

The input may be configured for operative connection to a controller for generating the pulsation signal. The controller may be a pulsator controller, or may be a milking panel. The input may comprise a connector for (e.g. detachable) connection with a cable (to connect the system to the controller).

The system may comprise an output configured to supply the pulsation signal to a pulsator. The output may, for example, comprise a connector for (e.g. detachably) connecting the device to a cable capable of carrying the electrical pulsation signal. The system may configured such that the pulsation signal provided by the output is substantially unchanged with respect to the pulsation signal received by the input.

The monitoring system may therefore be configured for operative connection between a controller (for generating a pulsation signal) and a pulsator (operative in response to the pulsation signal). Providing detachable connectors (for the input and output) may allow the monitoring system to be removably connected between the controller and pulsator. Thus, the monitoring system may be configured for retrofitting within an existing milking point system for controlling a milking point, between a controller (for producing a pulsation signal) and a pulsator.

The monitoring system may be configured for connection to a pulsator comprising a plurality of (e.g. two) solenoids controlled by the pulsation signal. The system may be configured to separately measure the current and/or voltage for each solenoid of the pulsator (and may thus perform the comparisons discussed above, separately, for each of the measured currents and/or voltages). The system may comprise two current sensors, each for measuring current of a respective pulsator coil. The system may comprise two voltage sensors, each for measuring the voltage of a respective pulsator coil.

Such a pulsator (comprising two solenoids) may comprise two outlets (e.g. tubes) served by the two solenoids. Accordingly, the monitoring system may be configured for use with a pulsator comprising two outlets for exchanging air with a cluster. In this respect, the monitoring system may comprise two pressure sensors (one for each outlet of the pulsator). That is, the pressure sensor discussed above may be a first pressure sensor and the monitoring system may comprise a second pressure sensor. Each pressure sensor may be as described above (e.g. measuring pressure and providing a pressure signal to the processor). The processor may be configured to process each pressure signal as described above (i.e. therefore providing analysis on both lines/teat cups).

The monitoring system may be configured for connection to two pulsators (i.e. serving two corresponding milking points). In this respect, the pulsation input may be a first pulsation input for receiving a first pulsation signal, and the monitoring system may comprise a second pulsation input (i.e. which may be as described above with respect to the first pulsation input) for receiving a second pulsation signal. This may minimise the equipment required for monitoring the cluster and thus may reduce the complexity of the system.

Each of the two pulsators may be as described above (e.g. each comprising two solenoids and two outlets). Hence, the monitoring system may comprise four voltage sensors, four current sensors and four pressure sensors.

The monitoring system may comprise (or may be in the form of) a monitoring device. The input, sensor and/or processor (and various other components described above) may form part of a single device.

The monitoring system (e.g. the monitoring device) may comprise a communication interface configured for communicating data to a receiver. The communication interface may be configured to communicate alerts, generated by the processor, to the receiver. The communication interface may also be configured to communicate alerts to a peripheral device, such as a mobile device (e.g. via a cellular network). In some embodiments, the receiver may instead be configured to communicate the alert to the peripheral device. The communication interface may be configured to communicate data representative of one or more measured characteristics to the receiver (e.g. voltage, current, pressure, etc.)

The communication interface may be a wireless interface, such as that described above with respect to the first aspect. For example, the wireless interface may be a Bluetooth™ interface configured to communicate wirelessly with external devices according to the Bluetooth™ wireless technology standards. The wireless interface may be, or may be based on, a Bluetooth Low Energy interface. The wireless interface may, of course, comprise another form of low energy wireless technology, such as Wi-Fi HaLow.

The pulsator(s), cluster and/or controller (e.g. milking panel or pulsator controller) may form part of the system.

The monitoring system of the second aspect may be as otherwise described with respect to the first aspect above and/or the third aspect described below. Thus, the monitoring system of the second aspect may comprise one or more features of the first and/or third aspects. As an example, the monitoring system of the second aspect may comprise the power harvesting module of the third aspect, which may power various components of the monitoring system (e.g. processor, sensors and wireless interface).

In a third aspect, there is provided a monitoring system for monitoring a milking point, the monitoring system comprising:
  a connector configured for electrical connection with a solenoid of a pulsator of the milking point; and
  a power harvesting module configured to harvest power from a flyback voltage generated by the solenoid upon interruption of a current supplied to the solenoid.

The ability to harvest power from the flyback voltage may reduce the external power requirements of the system. This has environmental benefits, and can lower the cost of operating a milking parlour (especially when many of such systems are used for monitoring milking points of the milking parlour). In some cases, the use of flyback voltage could mean the system does not require a battery or an external source of power. This may simplify installation of the system, and may therefore reduce the cost of installing the system. For example, it may avoid the need to install cabling from an external power source to the system. Likewise, the reduction in complexity of the system may simplify maintenance requirements. The term "flyback voltage" is used to describe the voltage that forms across an inductive load when the current supplying that load is suddenly reduced or interrupted.

The monitoring system may comprise an input configured to receive an electrical pulsation signal for controlling pulsation of a pulsator. The power harvesting module may be configured to harvest power from the pulsation signal. The power harvesting module may be configured to harvest power during activation periods of the pulsation signal.

Thus, the power harvesting module may be configured to harvest power from both the pulsation signal and the flyback voltage from the solenoid. The pulsation signal power may be harvested during the activation periods, and the flyback voltage power harvested immediately after an activation period (i.e. the start of a deactivation period).

The connector (configured for electrical connection with the solenoid) may be an output of the system, configured for providing the pulsation signal to the pulsator. Thus, the connector (or output) may both provide the pulsation signal to the pulsator and receive power via the flyback voltage.

The input and output may both be in the form of connectors for detachable connection with e.g. cables for connection between a controller (for providing a pulsation signal) and a pulsator.

The power harvesting module may be configured to store harvested power. The power harvesting module may comprise a power storage device for storing harvested power. The power storage device may comprise a capacitor.

The power harvesting module may comprise one or more diodes arranged to direct current to the power storage device.

The power harvesting module may be configured to supply power to one or more components of the monitoring system (e.g. processor, sensors, wireless interface, etc.). Such power supply may be provided from the power storage device. To ensure the monitoring system is able to operate using such power supply, it may be configured for lower power consumption (e.g. lower than 50 mA in steady state).

The storage of power may mean that the monitoring system has a supply of power (from the power storage device) during deactivation periods of the pulsation signal (where no power, or minimal power, may be provided by the pulsation signal).

The power harvesting module may comprise a rectifier. The rectifier may comprise a 3-phase full-wave bridge rectifier circuit.

The power harvesting module may comprise a transient-voltage-suppression (TVS) diode. The TVS diode may be arranged in parallel with the capacitor.

The monitoring system may comprise a sensor for measuring an operating characteristic of the milking point. The sensor may be powered by the power harvesting module (e.g. may be configured to receive power from the power storage device).

The sensor may be a pressure sensor configured to measure the pressure (or vacuum) at an outlet of the pulsator. Such a pulsator may include two outlets (i.e. tubes) for exchanging air with the two pairs of teat cups. In this respect, the monitoring system may comprise two pressure sensors (one for measuring each outlet of the pulsator).

The system may be configured for connection to a pulsator comprising a plurality of (e.g. two) solenoids. Accordingly, the power harvesting module may be configured to harvest power from a plurality of solenoids (e.g. from the flyback voltages of a plurality of solenoids). The power storage device may store power harvested from both solenoids. By harvesting power from a plurality of solenoids (which may operate in different phases), the distribution of harvested power may be smoother.

The monitoring system may be configured for use with two pulsators serving two corresponding milking points. Thus, the monitoring system may be configured for connection to two pulsators (e.g. may comprise two connectors). The monitoring system may comprise two power harvesting modules (each as described above), or a single power harvesting module configured to harvest power from the flyback voltages generated by the solenoids of both pulsators. The monitoring system may be configured for use with (or may comprise) more than two (e.g. three, four, five, six) pulsators.

Harvesting power from more than one pulsation signal may provide a more consistent supply of power to the device. For example, where the pulsation signals are offset (e.g. the milking phase of one signal differs in timing from the other), the duration in which power can be harvested from at least one of the pulsation signals is increased. Accordingly, such an arrangement may reduce the amount of time that zero power is supplied to the milking system (i.e. during a milking session), which may reduce the power storage requirements of the power harvesting module (i.e. of the power storage device).

The monitoring system may comprise (or may be in the form of) a monitoring device. Thus, the connector, sensor and power harvesting module (and various other components discussed above) may form part of a single device.

The pulsator(s), cluster and/or controller (e.g. milking panel or pulsator controller) may form part of the system.

The monitoring system of the third aspect may be as otherwise described above with respect to the first and/or second aspect. Thus, the monitoring system of the third aspect may comprise one or more features of the first and/or second aspects. For example, the monitoring system may comprise a processor for processing the pulsation signal and/or pressure signal according to that described above. The monitoring system may similarly comprise a communication interface (e.g. a wireless interface) such as that described above. These may be powered by the power harvesting module.

In a fourth aspect there is provided a method of operating a monitoring system of the third aspect, the method comprising providing first and second pulsation signals to the monitoring system, the phases of the first and second pulsation signals being offset.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1:
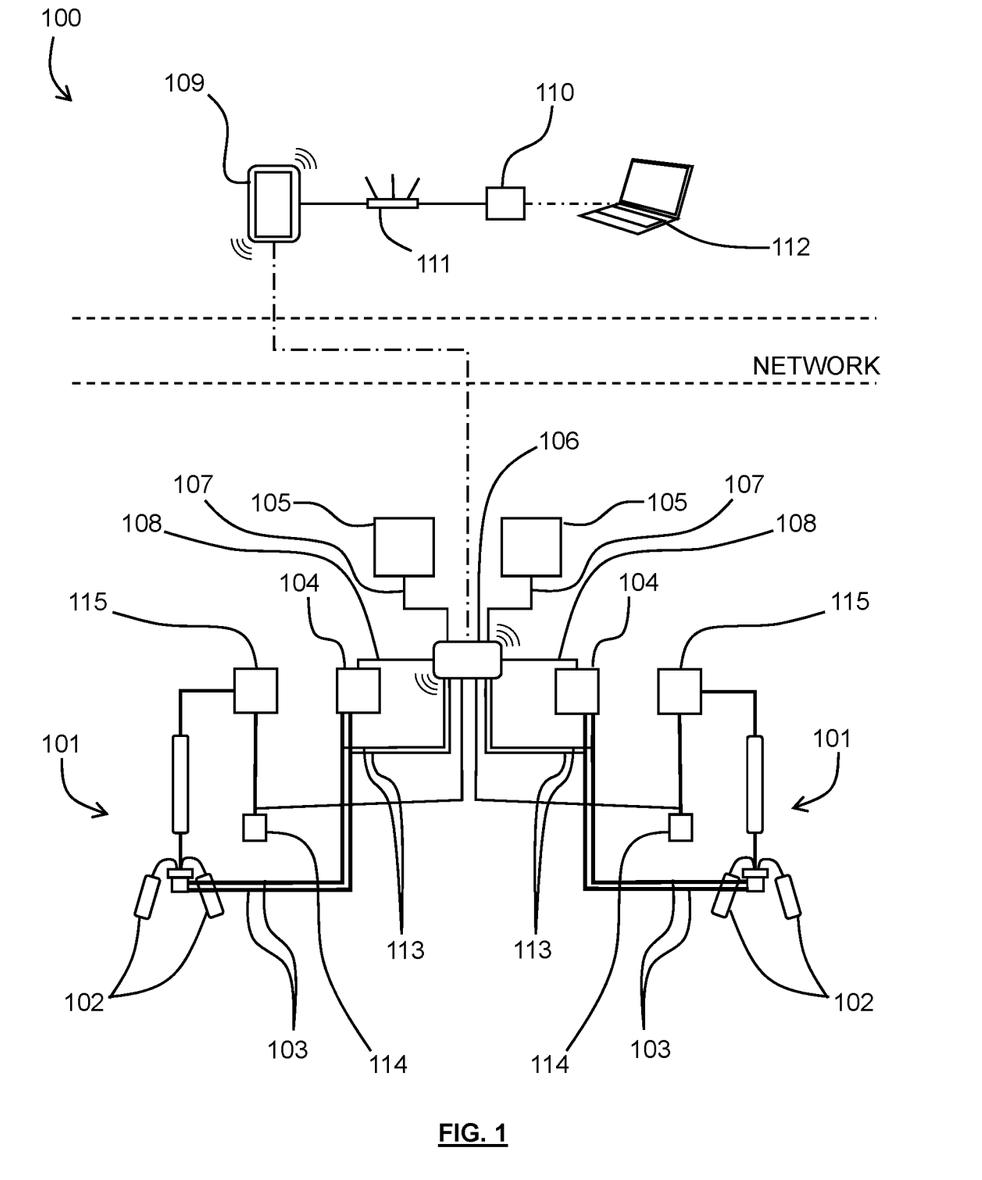
FIG. 1 is a schematic illustrating milking points including a monitoring system.

FIG. 1 illustrates a milking system 100 for extracting milk from animal, such as a cow. In particular, the milking system 100 is arranged to serve two milking points (for milking two animals) and thus comprises two corresponding clusters 101, each having four teat cups 102 (although only two are shown) for attachment to an animal.

For brevity, only one of the clusters 101 (and associated equipment) will be discussed, but it should be appreciated that both clusters 101 are the same. Each teat cup 102 is connected to one of two vacuum lines 103; a first of the vacuum lines 103 supplying the two front teat cups 102 and a second of the two vacuum lines 103 supplying the two rear teat cups 102.

Both vacuum lines 103 are connected to a single pulsator 104. The pulsator 104 comprises two solenoid valves that each serves one of the vacuum lines 103. The solenoid valves open and close so as to alternate between applying a vacuum to the vacuum lines 103 and allowing air at atmospheric pressure to flow into the vacuum lines 103. The opening and closing of the valves occurs in a continuous manner so as to form repeated "pulses" of vacuum in the vacuum lines 103, and thus in the teat cups 102.

Although not illustrated, each teat cup 102 comprises an outer shell formed of a rigid material and an inner liner attached to the outer sleeve so as to define a cavity therebetween. The teat cup is tubular, such that an inner surface of the inner liner forms a central passage extending longitudinally therethrough. In operation, an animal's teat is inserted into an upper opening of this passage and a further vacuum (separate to that discussed above) is applied to a lower opening of the passage so as to draw milk from the teat. The vacuum lines 103 are fluidly connected to the cavity between the inner liner and the outer shell. When the cavity is at atmospheric pressure, the vacuum applied to the central passage causes the inner liner to collapse inwardly and across the passage, so as to close the passage between the upper and lower openings, and relieve the teat from the vacuum applied to the passage. This is considered the non-milking (or rest) phase of the teat cup, because milk is not being extracted from the animal. When a vacuum is applied to the cavity between the liner and the shell (via the vacuum lines 103), the liner retracts outwardly so as to open the passage, such that the teat is exposed to the vacuum applied at the lower opening of the passage. This is considered the milking phase, because milk is extracted from the animal when the liner is in this position.

As should thus be apparent, the repeated pulses of vacuum provided by the pulsator 104, via the vacuum lines 103, results in alternating milking and non-milking phases of the teat cups 102. The provision of this alternating pattern (as opposed to, for example, a constant vacuum applied to the teat) reduces damage to the teat, and facilitates optimum milk output from the animal.

The pulsator 104 is driven in the manner described above by an electrical pulsation signal which actuates the solenoid valves of the pulsator 104. The electric pulsation signal is produced by a controller 105, which may be in the form of a pulsator controller or a milking panel (also referred to as a milk point controller). In the illustrated embodiment, however, the controller 105 is not directly connected to the pulsator 104. Rather, a monitoring device 106, forming part of a monitoring system, is operatively connected between the controller 105 and pulsator 104.

Accordingly, in operation, the controller 105 generates a pulsation signal, which is then supplied to the monitoring device 106 via a wired connection 107 (e.g. a cable) between the controller 105 and the monitoring device 106. The pulsation signal is then supplied from the monitoring device 106 to the pulsator 104 via a further wired connection 108.

As will be discussed in more detail further below (with reference to FIG. 2), the monitoring device 106 is configured to harvest power from the pulsation signal received from the controller 105. In this way, the monitoring device 106 does not require a battery or a connection to an external power supply (i.e. other than the controller 105). The monitoring device 106 requires this power for a number of functions (which will, again, be discussed further below), including the ability to monitor various aspects of the milking system 100.

One such aspect is the pressure in the vacuum lines 103 connected between the pulsator 104 and the cluster 101. The monitoring device 106 is fluidly connected to the vacuum lines 103 by tubes 113 and is configured to measure the pressures (of vacuum lines 103) via the tubes 113.

The monitoring device 106 also monitors shut off sensors 114 operatively connected to control valves 115 that facilitate detachment of the cluster 101 from the animal. As will be discussed below, by monitoring the shut off sensors 114, the monitoring device 106 (or an external device connected thereto) may be able to identify the start, end and duration of a milking session.

In the illustrated embodiment, the monitoring device 106 is configured to wirelessly communicate (e.g. exchange data) with a receiver 109. The receiver 109 is connected (via a LAN connection) to a diagnostic server 110, and both the receiver 109 and the diagnostic server 110 are connected wirelessly, via a wireless router 111 to a client computing device 112 (in the form of a laptop).

The receiver 109 comprises a wireless interface for communicating with the monitoring device 106, a memory for storing data received from the monitoring device 106, a display for conveying information to an operator (such as alerts received from the monitoring device 106). As may be appreciated, the receiver 109 may be configured for connection to additional monitoring systems (i.e. for monitoring additional milking points of a milking parlour).

Figure 2:
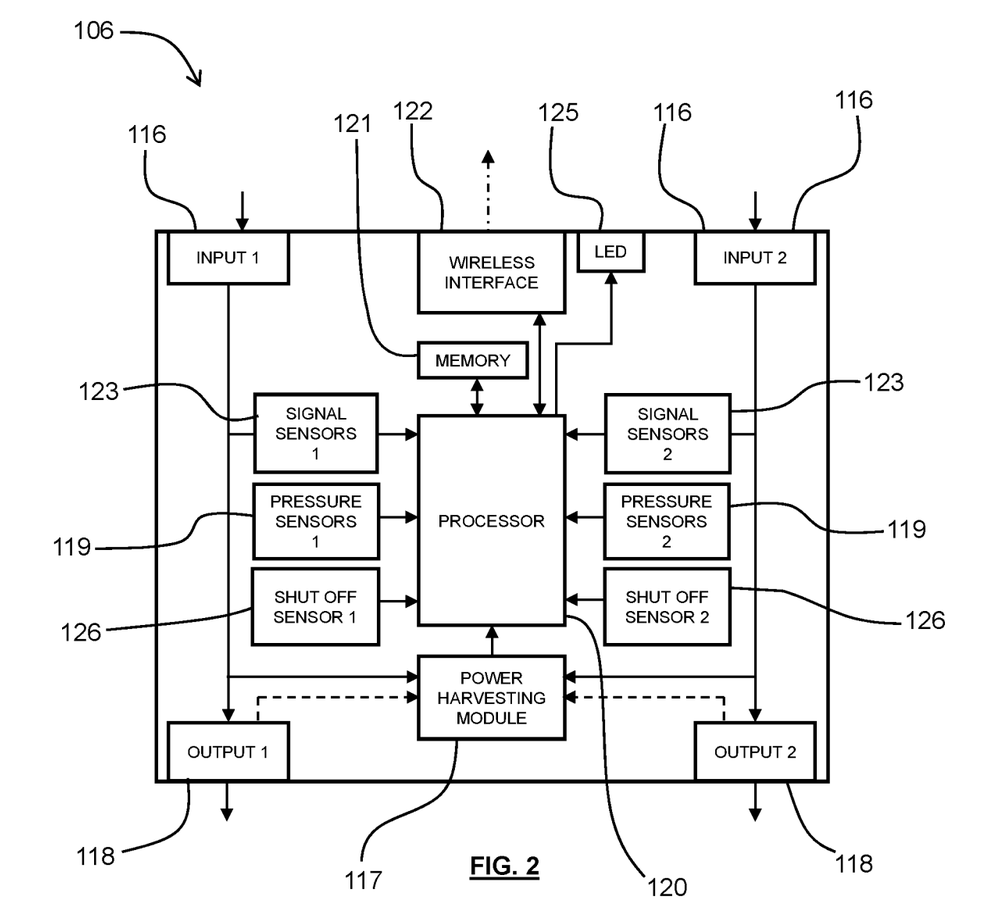
FIG. 2 is a schematic illustrating a monitoring device of the monitoring system of FIG. 1.

FIG. 2 schematically illustrates the monitoring device 106 in more detail. The monitoring device 106 comprises two inputs 116, each for receiving a respective pulsation signal from a corresponding controller 105. Both of these inputs 116 (which may each comprise a connector for detachable connection with a cable) are connected to a power harvesting module 117 configured to harvest power from the pulsation signals provided by the inputs 116. In other words, a small portion (i.e. small enough so as not to be detrimental to the function of the signal) of the current supplied by the pulsation signal is directed to the power harvesting module (as illustrated by the arrows in FIG. 2).

The power harvesting module 117 may comprise a rectifier through which the portion of the pulsation signal received by the power harvesting module 117 may pass. The rectifier may, for example, comprise a 3-phase full-wave bridge rectifier circuit.

The power harvesting module 117 also comprises a power storage device (not shown) in the form of a capacitor, for storing power harvested from the pulsation signals. Each pulsation signal has activation periods, in which the signal supplies a current, and deactivation periods, in which no current is supplied. The activation periods and deactivation periods alternate, such that the signal comprises "pulses" of power supply. Thus, depending on when pulses are received, the monitoring device 106 may experience periods (during a milking session), when no power is received from the pulsation signals. The provision of the power storage device means that, during these periods, stored power can be supplied to components of the monitoring device 106 by the power storage device of the power harvesting module 117.

The provision of two inputs 116, and two corresponding pulsation signals can, however, provide a more consistent source of power (i.e. when compared to a single pulsation signal). As each input 116 receives a different pulsation signal, the signals may be out of phase, such that e.g. when one signal is providing power, the other is not. In this way, the power harvesting module 117 may be able to more consistently harvest power from the pulsation signals. This may mean the monitoring device 106 has less reliance on stored power for operation. In other embodiments, more inputs may be provided, which may again increase the consistency of the power supplied to the device.

The portion of each pulsation signal that is not directed to the power harvesting module 117, is instead directed to a respective output 118 (which may comprise a connector for detachable connection with a cable). As discussed above with respect to FIG. 1, the outputs 118 are operatively connected to pulsators 104, such that each pulsation signal is provided to a corresponding pulsator 104 for controlling the pulsator 104. As noted above, the power harvested from each pulsation signal is small enough that the operation of each pulsator 104 is unaffected.

As noted above, each pulsation signal controls movement of two solenoids (forming part of solenoid valves) of each pulsator 104. Each pulsation signal is a square wave and comprises activation periods in which current is suppled to each solenoid and deactivation periods in which no current is supplied to the solenoids of the pulsator. When a current supply to an inductive load (such as a solenoid) is interrupted, a spike in voltage is generated (referred to herein as flyback voltage). As indicated by the broken lines from each output 118 to the power harvesting module 117, the current generated by this voltage spike is directed (e.g. by one or more diodes) to the power harvesting module 117. In this way, the power storage device is able to store the power, resulting from the voltage spike, for later use by various components of the monitoring device 106.

Although not shown, the current may be directed by way of diodes and, again, may be rectified by the rectifier. The power harvesting module may also comprise a transient-voltage-suppression (TVS) diode, which may limit the voltage peaks resulting from the voltage spike.

The activation and deactivation periods of the pulsation signal cause the pulsators 104 to alternate between the provision of atmospheric pressure and vacuum at their respective outlets. The pressure at these outlets is measured by pressure sensors 119 forming part of the monitoring device 106. For reasons of clarity, the connections to these pressure sensors are not illustrated, but it should be appreciated that the device 106 comprises connectors configured to detachably connect tubes for fluid connection to the outlets of the pulsators 104 (so as to allow the pressure sensors 119 to measure pressure at the outlets of the pulsators 104).

The monitoring device 106 comprises four pressure sensors 119, two for each pulsator 104, because each pulsator 104 comprises two outlets (each serving two teat cups of a cluster).

Each pressure sensor 119 measures a respective pressure and provides a pressure signal, indicative of that pressure, to a processor 120 (e.g. a microprocessor) of the device 106.

As previously explained, each pressure signal will follow a curve that comprises four phases: an "A" phase, in which the pressure transitions from atmospheric to vacuum; a "B" phase, in which the vacuum is maintained; a "C" phase, in which the pressure transitions from vacuum to atmospheric; and a "D" phase in which atmospheric pressure is maintained. The processor 120 is configured to identify each of these phases (e.g. by way of the pressure crossing a threshold) and make decisions based on the duration of each phase.

The processor 120 is configured to compare the duration of each phase with both a minimum threshold duration value and a maximum threshold duration value (i.e. the range between the minimum and maximum thresholds defining a tolerance) for that phase. The thresholds may be stored on a memory 121 of the monitoring device 106, and may be retrieved from the memory 121 by the processor 120. The threshold values can also be set by the processor 120 upon receipt (by the processor) of instructions to do so. Such instructions are provided via a wireless interface 122 of the device 106, which (as shown in FIG. 1) is wirelessly connected to a receiver 109. The wireless interface 122 will be discussed further below.

In addition to comparing the phase durations with thresholds, the processor 120 compares the pressure signal with minimum and maximum pressure threshold values (stored in the memory 121). This ensures that the pulsators 104 are operating within suitable parameters.

Where a maximum threshold (either pressure or phase duration) is exceeded or a measured value falls below a minimum threshold, this may be indicative of an issue with the system 100. Such an issue could, for example, be a blockage in the system 100 or a fault with a pulsator 104. Accordingly, where a measured value falls outside of a desired range (i.e. is below/above a min/max threshold) the processor 120 generates an alert signal. This alert signal is passed to the wireless interface 122, which communicates the signal to the receiver 109. The receiver 109 further communicates the alert signal to the diagnostic server 110 and computing device 112. This allows an operator to be alerted (e.g. by display of an alert) to an issue with the system. The alert signal may be accompanied with information regarding which threshold has been passed, which may allow the operator to determine a cause of the issue and take action to rectify the issue.

In addition to generating the alert signal, the processor 120 instructs a user interface of the device 106 (in this case an LED 125) to indicate to an operator that an issue has been detected. In response, the LED illuminates such that an operator in the vicinity of the device 106 can identify that there may be an issue with the system 100 and can investigate further.

The device 106 also comprises two sets of signal sensors for measuring characteristics of the pulsation signals. In particular, each set of sensors 123 monitors a pulsator 104 of the system 100. Each set of sensors 123 comprises two voltage sensors and two current sensors (such that the monitoring device 106 has a total of four voltage sensors and four current sensors). Each of the voltage sensors measures the voltage applied to a solenoid of a respective pulsator 104. Each of the current sensors measures the current drawn by a solenoid of a respective pulsator 104.

The processor compares each current and voltage signal against respective minimum and maximum current and voltage threshold values. As per the pressure and phase duration threshold values discussed above, the current and voltage and threshold values are stored in the memory 121 and may be set by the processor 120 (upon receipt of an instruction to do so via the wireless interface 122). Where a maximum threshold is exceeded, or a measured value falls below a minimum threshold, the processor 120 generates an alert signal and provides this signal to the wireless interface (as discussed above with respect to the pressure measurements). These alerts can then be acted on by an operator (e.g. by inspecting components of the system 100). The processor 120 also instructs the LED to illuminate so as to notify an operator of a potential issue with the system 100.

The processor 120 is also configured to compare each pulsation signal with the corresponding pressure signals associated with the pulsator 104 receiving the pulsation signal. As should be appreciated, in normal operation, each pressure signal should generally follow the pulsation signal controlling the pulsator 104 associated with the pressure signal. Thus, where there are significant deviations between the signals, this can be indicative of an issue with a component of the system 100.

Accordingly, the processor 120 is configured to compare the phase of each pulsation signal with that of each corresponding pressure signal. For example, the processor 120 may determine the duration between the start of an activation period of a pulsation signal and the start of a cycle (i.e. the start of the "A" phase) of a pressure signal. Where this duration exceeds a threshold duration value, this may be indicative of an issue with the corresponding pulsator 104. The processor 120 will generate an alert in response to the threshold being exceeded, which will be transmitted via the wireless interface 122, and displayed via the LED 125.

The process 120 may make other comparisons between each pulsation signal and corresponding pressure signals. One such comparison may be between the end of an activation period of a pulsation signal and the start of a "C" phase of a corresponding pressure signal. Where the duration between these two events exceeds a threshold duration value, the processor 120 may generate an alert.

The system 100 is additionally configured to determine the start and end of a milking session. As discussed above, a milking session starts when a cluster 101 is attached to an animal (i.e. and the cluster 101 begins to extract milk from the animal) and ends when the cluster 101 is detached from the animal. In a first type of milking point, the controller 105 manages the start and end of a milking session by way of the pulsation signal. That is, to start a milking session, the controller 105 begins producing a pulsation signal (to control a pulsator 104) and to end a milking session, the controller 105 stops the pulsation signal. In a second type of milking point, the pulsators 104 are continuously active, regardless of whether the cluster 101 is attached to an animal.

The present monitoring system is configured to accommodate both types of milking point. In the case of the first type of milking point, a further processor (not shown) forming part of the receiver 109 or diagnostic server 110 identifies the start and events of a milking session. The further processor does this based on the connection of the receiver to the monitoring device 106. As discussed above, the monitoring device 106 is powered by the pulsation signal, and the flyback voltages generated by the solenoids of the pulsators 104. As such, the monitoring device 106 is only powered when a pulsation signal is being received. Thus, when the pulsation signals are not being received, components of the monitoring device 106, including the wireless interface 122, are inactive.

In order to communicate with the wireless interface 122, the receiver 109 sends periodic data requests. When the wireless interface 122 is active and receives such a request, it responds (which may include responding with data such as measured values). When a response is received, this is deemed a successful request. When the wireless interface 122 is inactive, it is unable to respond to data requests. When a response to a data request is not received by the receiver 109, this is deemed an unsuccessful request.

The further processor is configured such that an end event of a milking session is identified (and recorded) when a predetermined number of successive unsuccessful data requests occur. By doing so only after a number of unsuccessful requests have occurred (rather than after the first unsuccessful request), erroneous recordal of an end event (e.g. due to a temporary loss of connection) can be avoided. The further processor is also configured to identify a start event upon the occurrence of a first successful request (i.e. after a period of unsuccessful requests).

Timestamps for the start and end events are recorded and the further processor determines a milking session duration by determining the period of time between successive start and end events.

In the second type of milking point noted above (in which the pulsators 104 remain active after detachment) it is not possible to determine the start and end of a milking session based on data requests. To accommodate such arrangements, the monitoring device 106 comprises shut off sensors 126 that are configured for connection to the shut off valves 114 forming part of the system 100. Signals provided by these shut off valves 114 indicate whether a milking session is occurring. In this way, the processor 120 of the monitoring device 106 is able to determine start and end events for each milking session (for each cluster).

In addition to communicating alerts to the receiver 109 (via the wireless interface 122), the processor 120 is configured to communicate data indicative of the measured pressures, phase durations, pulsation signal currents and voltages, and milking session (start and end events). This transfer of data may occur on a periodic basis. For example, the processor 120 may be configured to initiate a transfer of the data on a daily basis, which may be beneficial for power consumption. Alternatively, the processor may be configured to transfer this data after each milking session, or in real-time, upon receipt of the measured values.

Where the processor 120 is configured to initiate the transfer of this data at the end of each milking session, the power harvesting module is configured to store sufficient power to allow this to happen. That is, the power storage device (capacitor) is configured so as to be able to store more power than is required to transmit this data to the receiver via the wireless interface 122. In this way, after the end of a milking session, when no pulsation signal is being received (and thus no power is being received by the device 106), the components of the device 106 required to transmit data wirelessly are able to function by receiving power from the power storage device of the power harvesting module 117.

In order to minimise the amount of power required to transmit data from the device 106, the wireless interface 122 is configured to communicate via a low energy communication protocol (such as Bluetooth™ low energy). To further minimise the power requirements, the wireless interface 122 is configured to communicate with the receiver only during periods in which a milking session is occurring (i.e. as discussed above it is inactive during periods in which no pulsation signal is received). That is, the wireless interface 122 is configured to only send out advertisements (i.e. indicating connection is possible) from the time of a start event to the time immediately after milking session data has been transmitted). To accommodate this, the communication protocol used by the receiver and the wireless interface 120 comprises a polling logic that assumes a lack of response from the monitoring system 106 is indicative that neither cluster monitored by the device 106 is being utilised (i.e. neither is within a milking session).

Figure 3:
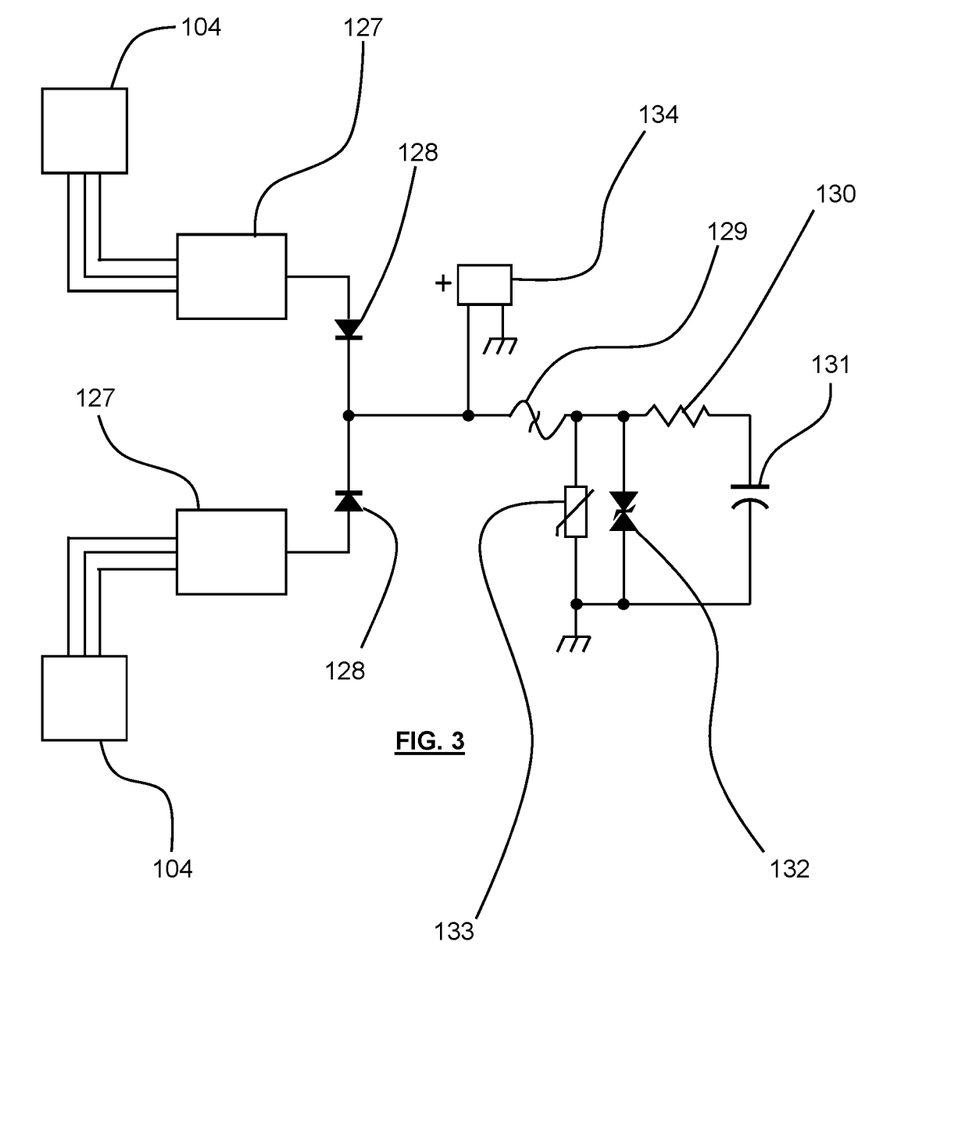
FIG. 3 is a schematic illustrating a power harvesting module of the monitoring system.

FIG. 3 illustrates an exemplary wiring arrangement of the power harvesting module 117 for harvesting power from the collapse in magnetic field of the solenoids of two pulsators 104 (upon interruption of current). The power harvesting module comprises two rectifiers 127 (e.g. a 3-phase full-wave bridge rectifier circuits) through which current from each pulsator 104 passes. These are connected to two opposing diodes 128 which direct current from both pulsators 104 to a power harvesting circuit comprising a resettable fuse 129 and resistor 130 in series, and a power storage device (capacitor 131), TVS 132 and thermistor 133 in parallel. Power generated by the flyback voltage is stored by the capacitor 131 for use by the components of the device (indicated by box 134) as required.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

As an example of one such modification, the various functions of the processor 120 of the monitoring device 106 may instead be performed by a processor external to the monitoring device 106 (e.g. forming part of the receiver 109 or the diagnostic server 110). Thus, the raw measured values (measured by the various sensors of the device 106) may be transmitted to the external processor for processing.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

What is claimed is:

1. A monitoring system for monitoring a milking point, the monitoring system comprising:
   an input configured to receive an electrical pulsation signal for controlling pulsation of a pulsator; and
   a processor configured to identify the occurrence of a milking session based on the electrical pulsation signal received by the input.

2. A monitoring system according to claim 1 wherein the input forms part of a monitoring device, the monitoring device comprising a communication interface for communication with the processor.

3. A monitoring system according to claim 2 wherein the monitoring device is configured so as to be powered by the pulsation signal, such that when receiving the pulsation signal the monitoring device is in an active state and when not receiving the pulsation signal the device is in an inactive state.

4. A monitoring system according to claim 3 wherein the processor is configured to record a start event indicative of the start of a milking session when the processor determines that the monitoring device has changed from an inactive state to an active state.

5. A monitoring system according to claim 3 wherein the processor is configured to record an end event indicative of the end of a milking session when the processor determines that the monitoring device has changed from an active state to an inactive state.

6. A monitoring system according to claim 3 wherein the processor is operatively connected to a receiver configured to send periodic data requests to the wireless interface, and wherein the wireless interface is configured to respond to the data requests when the monitoring device is in an active state.

7. A monitoring system according to claim 6 wherein a data request to which the communication interface does not respond is deemed an unsuccessful request, and wherein the processor is configured to record an end event in response to a predetermined number of successive unsuccessful requests.

8. A monitoring system for monitoring a milking point, the monitoring system comprising:
   an input configured to receive an electrical pulsation signal for controlling pulsation of a pulsator;
   a signal sensor configured to measure a characteristic of the pulsation signal; and
   a processor configured to determine an operating condition of the milking point based on the measurement, made by the signal sensor, of the characteristic of the pulsation signal for controlling pulsation of the pulsator.

9. A monitoring system according to claim 8 wherein the processor is configured to compare the pulsation signal with a pressure signal indicative of pressure at an outlet of the pulsator to determine an operating condition of the milking point.

10. A monitoring system according to claim 9 wherein the processor is configured to determine a phase difference between the pressure signal and the pulsation signal.

11. A monitoring system according to claim 8 comprising a pressure sensor configured to measure pressure at an outlet of the pulsator, the pressure sensor configured to generate a pressure signal indicative of the measured pressure.

12. A monitoring system according to claim 8 wherein the processor is configured to generate an alert when the determined operating condition is not a desired operating condition.

13. A monitoring system according to claim 8 wherein the processor is configured to determine whether the measured characteristic falls within a desired range and to generate an alert when the measured characteristic falls outside of the desired range.

14. A monitoring system according to claim 8 wherein the monitoring system comprises an output configured to supply the pulsation signal to a pulsator.

15. A monitoring system according to claim 14 wherein the signal sensor is a current sensor for measuring a current drawn by the pulsator when connected to the output.

16. A monitoring system according to claim 14 wherein the signal sensor is a voltage sensor for measuring a voltage applied to the pulsator when connected to the output.

17. A monitoring system for monitoring a milking point, the monitoring system comprising:
- a connector configured for electrical connection with a solenoid of a pulsator of the milking point; and
- a power harvesting module configured to harvest power from a flyback voltage generated by the solenoid upon interruption of a current supplied to the solenoid.

18. A monitoring system according to claim 17 comprising an input configured to receive an electrical pulsation signal for controlling pulsation of a pulsator, the power harvesting module configured to harvest power from the pulsation signal.

19. A monitoring system according to claim 17 wherein the power harvesting module comprises a power storage device for storing harvested power.

20. A monitoring system according to claim 17 wherein the connector is configured for electrical connection with a plurality of solenoids of the pulsator, the power harvesting module configured to harvest power from the plurality of solenoids.

21. A monitoring system according to claim 17 comprising a sensor for measuring an operating characteristic of the milking point, the sensor powered by the power harvesting module.

* * * * *